United States Patent [19]

Kudo et al.

[11] 4,449,216
[45] May 15, 1984

[54] PICKUP ARM DEVICE

[75] Inventors: Shinichi Kudo, Neyagawa; Haruyuki Otani, Kadoma, both of Japan

[73] Assignee: Matsushita Electric Industrial Company, Kadoma, Japan

[21] Appl. No.: 312,011

[22] Filed: Oct. 16, 1981

[30] Foreign Application Priority Data

Oct. 17, 1980 [JP] Japan ................................. 55-146162
Jun. 5, 1981 [JP] Japan ................................... 56-87298

[51] Int. Cl.³ .............................................. G11B 3/10
[52] U.S. Cl. ................................................... 369/255
[58] Field of Search ........................ 369/255, 244, 252

[56] References Cited

U.S. PATENT DOCUMENTS 2,488,608 11/1949 Sinnett ................................ 369/247
3,949,995 4/1976 Guha .................................. 369/255

FOREIGN PATENT DOCUMENTS 942533 11/1963 United Kingdom ................ 369/244

Primary Examiner—Steven L. Stephan
Attorney, Agent, or Firm—Pollock, VandeSande & Priddy

[57] ABSTRACT

A pickup arm device for disc phonograph player comprising a pickup arm and a pivot holder integrally combined with the pickup arm and having an opening substantially at the center thereof to receive a pivot bearing and a pair of holes formed at opposite sides of the pivot holder. A pair of pivots are inserted into the pair of the holes so that they are brought into contact with the pivot bearing from the opposite sides. At least one of the paired pivots is fixedly secured to the pivot holder by means of a hardenable adhesive.

6 Claims, 5 Drawing Figures

PICKUP ARM DEVICE

BACKGROUND OF THE INVENTION

This invention relates to disc phonograph players and more particularly, to a pickup arm device of the disc phonograph player.

In order to ensure arbitrary vertical movement of an arm of pickup arm devices, it is the general practice to use a pivot mechanism in which pivots secured to a pivot holder are supported by pivot bearings. The superiority in operation of the pickup arm has ordinarily been evaluated by the sensitivity of the pickup arm. This is represented by a minimum load (mg) with which the arm can operate when loads are applied to the tip of the arm. The sensitivity of the arm is greatly influenced by the contacting force of the tip of the pivots exerted on the pivot bearing. Smaller contacting forces result in sharper sensitivity of the arm, thus improving the traceability to record grooves.

The pivots have heretofore been fixed by a method in which screw pivots are set in a pivot holder from opposite sides thereof so as to be pivotally supported by a pivot bearing and then fixed by means of lock nuts. However, this fixing method involves the problem that it is difficult to directly control the contacting force of the screw pivots exerted on the pivot bearing, so that the contacting force must be indirectly controlled by the use of the torque at the time of the setting of the screw pivots, and thus even though the torque is held constant, a true contacting force may vary owing to differences in accuracy of parts, leading to the scattering in sensitivity of the pickup arm. Further, even though a lock nut is employed, the screw pivots will loosen when mechanical vibrations are applied over a long time with the attendant disadvantage that there is a tendency for the pivots to become loose relative to the pivot bearing.

SUMMARY OF THE INVENTION

It is accordingly an object of the present invention to provide a pickup arm device which overcomes the diadvantages of the prior art.

It is another object of the invention to provide a pickup arm device by which the sensitivity of the arm can remarkably be improved.

It is a further object of the invention to provide a pickup arm device in which at least one of the pivots is secured to a pickup holder by means of a hardenable adhesive and is thus hard to loosen even when the device encounters vibrations over a long time.

The above objects can be achieved, according to the invention, by a pickup arm device which comprises a pickup arm, a pivot holder integrally combined with the pickup arm and having an opening substantially at the center thereof to receive therein a pivot bearing and a pair of through-holes formed at opposite sides of the pivot holder, and a pair of pivots inserted into the pair of holes until they come into contact with the pivot bearing, at least one of the paired pivots being fixedly secured to the pivot holder by means of a hardenable adhesive.

In a preferred embodiment, at least one of the pivots is formed to be a straight pivot free of any screw threads or irregularities on the side surface thereof. Also, the adhesive is an ultraviolet-hardenable and anaerobically hardenable adhesive.

BRIEF DESCRIPTION OF THE DRAWINGS

These and other objects, features and advantages of the present invention will become apparent from the following description taken in conjunction with the accompanying drawings, in which.

DETAILED DESCRIPTION OF THE INVENTION

Figure 1:
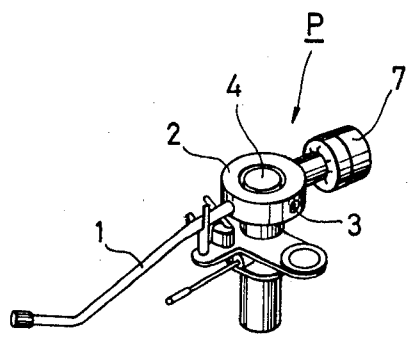
FIG. 1 is a schematic perspective view of a typical example of a pickup arm device.
Figure 2:
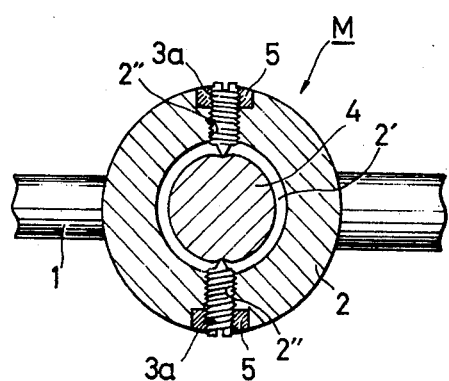
FIG. 2 is a sectional view of a known pivot mechanism.

Referring to FIGS. 1 and 2, there is shown a pickup arm device generally indicated at P which includes an arm 1 and a pivot holder 2 integrally combined with the arm 1. The pivot holder 2 has an opening 2' substantially at the center thereof to receive therein a pivot bearing 4 and through-holes 2", 2" formed at opposite sides of the holder 2. In order to allow vertical movement of the arm 1 with respect to a horizontal plane, pivots 3 set in the pivot holder through the through-holes are movably held at their tips with the pivot bearing 4 to form a pivot mechanism M. The pickup arm 1 is, as usual, provided with a weight balance 7 at one end and a cartridge (not shown) at the other end.

In prior art devices, the pivots 3 are secured as shown in FIG. 2. That is, screw pivots 3a, 3a are set in the pivot holder 2 at opposite sides thereof so that they are pivotally supported by the pivot bearing 4 as shown. Each screw pivot is fixed by means of a lock nut 5. However, this type of the pivot arrangement involves several disadvantages described hereinbefore.

Then, embodiments according to the invention are described with reference to FIGS. 3 and 4.

Figure 3:
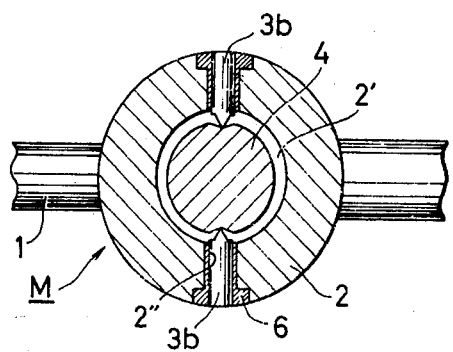
FIGS. 3 and 4 are, respectively, pivot mechanisms embodying the invention.

FIG. 3 shows a pivot mechanism M similar to the known mechanism shown in FIG. 2 but pivots 3b and 3b are free of any threads or irregularities on the outer or side surface thereof and are thus straight pivots. Both pivots are fixedly secured to the holes 2", 2" of the pivot holder 2 by means of adhesive 6.

Figure 4:
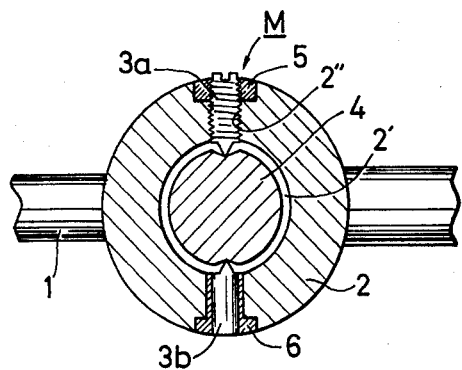

FIG. 4 shows another embodiment of the invention, which is the same as that shown in FIG. 3 except that one of the pivots is a screw pivot 3a and the other is a straight pivot 3b.

In either case, when the straight pivot is set in and secured to the pivot holder 2 by means of an adhesive, it should be biased and forced against the pivot bearing 4 upon application and curing of the adhesive such as, for example, by a spring or other suitable means so as to ensure intimate contact of the pivot with the pivot bearing 4 as will be particularly described in Examples appearing hereinafter. The paired pivots may be both fixed to the pivot holder 2 by the use of an adhesive as shown in FIG. 3 but it is rather preferable that one of the pivots is fixed by the screw-setting method. This is because when both pivots which have been fixed by means of an adhesive are worn out at the tip thereof by contact with the pivot bearing during use over a long time thereby causing looseness or lowering of sensitivity, it is almost impossible to re-adjust the relation of the contact between the pivot and pivot bearing. On the other hand, when one of the pivots is fixed by the screw-setting method as in the embodiment shown in FIG. 4, the screw adjustment is still possible even though the looseness or lowering of sensitivity takes place.

The adhesives useful in the practice of the invention are then described.

The adhesives should preferably be set or cured by irradiation from UV rays and/or anaerobically, and are fundamentally composed of anaerobically curable acrylate monomers or resins, organic peroxides and photosensitizers. If necessary, polymerization accelerators, polymerization inhibitors, colorants and thickeners may be added. The adhesives of this type have anaerobic curability or hardenability, i.e. they can be cured at a normal temperature in the absence of oxygen, and UV hardenability, i.e. they can be cured by irradiation of UV rays, and show excellent characteristics such as high heat stability, adhesion strength and the like after curing.

Representative examples of the anaerobically curable acrylate resins and monomers are shown below. It will be noted here that the acrylate resins or monomers used herein include methacrylate resins or monomers.

(1) Monoacrylates of the following formula:

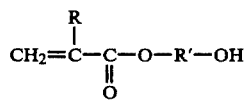

in which R represents a hydrogen atom or an alkyl group having 1-4 carbon atoms, and R' represents an alkylene group having 2-4 carbon atoms.

Monoacrylates represented by the above formula include, for example, 2-hydroxyethylacrylate, 2-hydroxyethylmethacrylate, 2-hydroxypropylacrylate, 2-hydrosypropylmethacrylate and the like.

(2) Polyfunctional acrylates of the following formula:

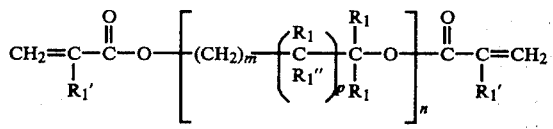

in which each $R_1$ represents a hydrogen atom, an alkyl group having 1-4 carbon atoms, a hydroxyalkyl group having 1-4 carbon atoms or a group of the formula

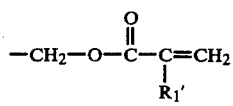

Each $R_1'$ represents a hydrogen atom, a halogen or an alkyl group having 1-4 carbon atoms, R" represents a hydrogen, —OH group or a group of the formula

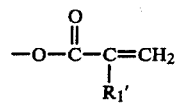

in which $R_1'$ has the same meaning as defined above, m is an integer of 1 or more, n is an integer of 2 or more, and P is 0 or 1.

The polyfunctional acrylates represented by the above formula include, for example, diethylene glycol dimethacrylate, triethylene glycol dimethacrylate, triethylene glycol diacrylate, tetraethylene glycol dimethacrylate, 1,2-propylene glycol dimethacrylate, dipropylene glycol dimethacrylate, diglycerol diacrylate, glycerine trimethacrylate, trimethylpropane trimethacrylate, diglycerol tetramethacrylate and the like.

(3) Epoxy-acrylate resins obtained by additional reaction of (metha) acrylic acid with epoxy resins For instance, methacrylic acid or acrylic acid is added to bisphenol A epoxy resins, novolac-type epoxy resins or fatty epoxy resins to obtain epoxy-acrylate resins.

Among these, acrylate resins which are obtained by mixing 20-70 parts by weight of hydroxyalkyl acrylates/methacrylates and 30-70 parts by weight of the acrylic/methacrylic acid adduct of bisphenol A-type epoxy resin show excellent adhesiveness and UV hardenability and are thus preferable.

Examples of the organic peroxides include benzoyl peroxide, methyl ethyl ketone peroxide, cumene hydroperoxide, ditertiary butyl peroxide, lauroyl peroxide, dicumyl peroxide and the like. The amount of the peroxide is preferably in the range of 0.1-10 parts by weight per 100 parts by weight of the acrylate resin. Less amounts than 0.1 part by weight are unfavorable because of the considerable lowering of the hardenability whereas larger amounts than 10 parts by weight will impede the physical properties of the adhesive which has been hardened.

Examples of the photosensitizers include benzoins such as benzoin, benzoin methyl ether, α-methylbenzoin, α-phenylbenzoin and the like, ketones such as acetonphenone, benzophenone and the like, quinones such as anthraquinone, chloroanthraquinone, methylanthraquinone, and the like, disulfides such as diphenyl sulfide, tetraethylthiuram disulfide and the like, diketones such as dibenzyl, diacetyl and the like, azos such as phenylazoisobutyro-nytrile, naphthylazoisobutyronitrile and the like, and ketals such as benzyl dimethyl ketal and the like. The amount of the photosensitizer is preferably in the range of 0.1-10 parts by weight per 100 parts by weight of the acrylate resin. Less amounts than 0.1 part by weight is unfavorable since a practical level of hardenability cannot be obtained while larger amounts than 10 parts by weight will impede the physical properties of hardened adhesive.

The adhesive used in the present invention may further contain the following additives, if necessary, in amounts indicated in parentheses, based on the adhesive composition.

(1) Polymerization inhibitors such as quinones, steric hindrance phenols for the purpose of improving storage stability (50-1000 ppm).

(2) Polymerization accelerators such as organic amines, metallic soaps and the like for accelerating the hardening of adhesive (0.1-5 wt%).

(3) Dyes or pigments for coloration (0.001-1 wt%).
(4) Thixotropic agents for imparting thixotropy to adhesive (0.1-5 wt%).
(5) Soluble polymers having an average molecular weight of $10^4$-$10^6$ to increase the viscosity of adhesive (0.1-20 wt%).
(6) Plasticizers for controlling the adhesion strength (0.1-5 wt%).

Aside from the adhesives showing UV and anaerobic hardenabilities, epoxy resin and cyanoacrylate adhesives may be used. In this connection, however, heat-curing resins are disadvantageous in that the size of parts are likely to change owing to thermal expansion. With normal temperature-hardening epoxy resin adhesives, they take a long hardening time, thus being poor in production. Further, cyanoacrylate adhesives can rapidly cure but are disadvantageous in their poor impact resistance. Accordingly, these resins should be properly used according to the required performance, if employed.

Fabrication of the pivot mechanisms shown in FIGS. 3 and 4 is particularly described in the following examples in which there is used an adhesive showing UV and anaerobic hardenabilities and having the following formulation:

| | |
|---|---|
| 2-hydroxyethylmethacrylate | 50 parts by weight |
| methacrylic acid adduct of bisphenol A-type epoxy resin | 50 parts by weight |
| cumene hydroperoxide | 2 parts by weight |
| benzyl dimethyl ketal | 2 parts by weight |
| p-benzoquinone | 0.01 parts by weight |

EXAMPLE 1

In this example, the pivot mechanism of FIG. 3 is described. First, the straight pivots 3b, 3b are inserted into the holes 2', 2' of the pivot holder 2 formed at opposite sides thereof until they reach the pivot bearing 4. The adhesive 6 is charged into spaces established between the walls of the holes 2', 2' and the straight pivots 3b, 3b while each straight pivot 3b is so biased by means of a spring that a load of 100 g is applied from the rear portion of the pivot toward the pivot bearing 4. Thereafter, a high pressure mercury lamp of 80 W/cm is applied to the adhesive for the ultraviolet irradiation under conditions of an irradiation distance of 10 cm from the adhesive and an irradiation time of 10 seconds, by which the adhesive 6 is cured to a depth of 1-2 mm from the surface thereof. By this curing, there can be obtained an adhesion strength which is sufficient to withstand an external force to be applied in a subsequent step. It will be noted that portions of the applied adhesive to which the ultraviolet rays are not permeably applied are anaerobically hardened while intercepting air (oxygen), by which such portions can be hardened at a normal temperature in about 1 hour. A final adhesion strength can be attained at the time when the device has been finished.

EXAMPLE 2

In this example, the pivot mechanism of FIG. 4 is described.

The screw pivot 3a and the set screw 5 are set in one of the holes 2'', 2'' of the pivot holder 2. Then, the pivot holder 2 and the pivot bearing 4 are held in position. Into the other hole 2'' is inserted the straight pivot 3b free of any irregularities on the side surface thereof until its tip contacts with the pivot bearing 4. Then, the adhesive 6 is charged into the space established between the straight pivot 3b and the hole walls while the straight pivot 3b is biased by means of a spring so that a load of 100 g is applied from the rear portion of the pivot 3b toward the pivot bearing 4. The adhesive is hardened in the same manner as described in Example 1.

EXAMPLE 3

Figure 5:
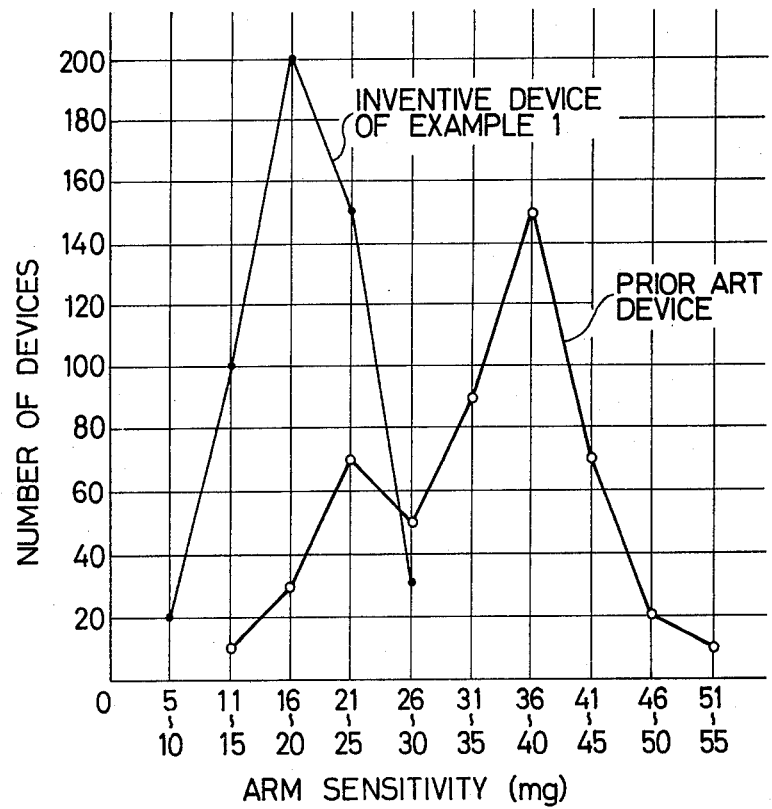
FIG. 5 is a graphical representation of sensitivities of a known pickup arm device and a pickup arm device according to the invention. Prior to discussing a pickup arm device according to the invention, a typical example of a pickup arm device and a known pivot structure or mechanism of such device will be first described briefly with reference to the accompanying drawings and particularly FIGS. 1 and 2 in which like reference numerals identify like parts.

Five hundred known pickup arm devices having such a pivot mechanism as shown in FIG. 2 are made by the screw setting method and 500 pickup arm devices of the invention having a pivot mechanism as shown in FIG. 3 are also made by the adhesive setting method. Both types of devices have an arm length of 250 mm with other parts being the same in size. These devices are subjected to arm sensitivity measurement. The results are shown in FIG. 5, revealing that the devices of the invention are sharper in sensitivity and exhibit smaller scattering of sensitivity than the prior art counterparts.

Similar results are obtained when the pivot mechanism shown in FIG. 4 is used.

As will be appreciated from the above examples, the device according to the invention has the following advantages and merits.

(1) Since the straight pivot or pivots are adhesively secured to the pivot bearing under a given load, the contacting force exerted on the pivot bearing becomes stabilized even though the accuracy of parts scatters, so that the scattering of the arm sensitivity can be reduced to a fair extent. The contacting force can be directly controlled and thus be reduced to a minimum, thus enabling the arm sensitivity to be improved to a degree twice or more as high as that of the prior art device.

(2) Use of UV-hardenable and anaerobically hardenable adhesives involves no application of heat and substantially no variation in size of parts due to the thermal expansion and thus stable arm sensitivity can be obtained. The hardening of the adhesive on the surface portion thereof by the UV irradiation in a short time (about 10 seconds) ensures an adhesion strength sufficient to withstand an external force which will be applied to the adhesive in a subsequent step. Accordingly, the adhesion process can substantially be completed within about 10 seconds, thus improving production. The portions of the applied adhesive which are not irradiated with the UV rays can anaerobically by hardened, so that the entire adhesive can completely be hardened before the device has been finished, ensuring excellent adhesion strength and impact resistance, coupled with a further advantage that even when mechanical vibrations are applied to the device over a long time, the pivots are firmly held without being loosened and thus substandard articles caused by the looseness can be reduced in number.

EXAMPLE 4

The prior-art and inventive pickup arm devices used in Example 3 are provided and each device is packed up in a foamed polystyrol case of a suitable form followed by subjecting the device to a vibrationan test using conditions of amplitude of 2 mm and the number of vibrations of 2000 cpm for 5 hours to check the number of loose defectives. The results are shown in Table below.

| | Device of Example 1 | Prior-art Device |
|---|---|---|
| Fraction Defective | 0/500 | 4/500 |

What is claimed is:

1. A pickup arm device for a disc phonograph player comprising a pickup arm, a pivot holder integrally combined with said pickup arm and having an opening substantially at the center thereof to receive therein a pivot bearing and a pair of through-holes at opposite sides of said pivot holder, and a pair of pivots inserted into the pair of through-holes until they come into contact with said pivot bearing from the opposite sides, at least one of the paired pivots being a straight pivot free of any irregularities on the side surface thereof and being fixedly secured to said pivot holder by means of a hardenable adhesive cured while being biased against said pivot bearing under a preselected load.

2. A pickup arm device according to claim 1, wherein the other pivot is a screw pivot which is set by screwing.

3. A pickup arm device according to claim 9, wherein said hardenable adhesive is a UV-hardenable and anaerobically hardenable adhesive.

4. A pickup arm device according to claim 1 or 3, wherein said hardenable adhesive has a composition which comprises: an acrylate material selected from the group consisting of a monoacrylate of the following formula

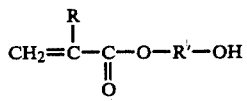

in which R represents a hydrogen atom or an alkyl group having 1–4 carbon atoms, and R' represents an alkylene group having 2–4 carbon atoms; a polyfunctional acrylate of the following formula

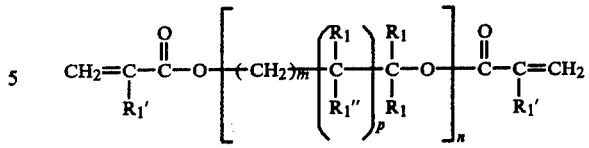

in which each $R_1$ represents a hydrogen atom, an alkyl group having 1–4 carbon atoms, a hydroxyalkyl group having 1–4 carbon atoms, or a group of the following formula

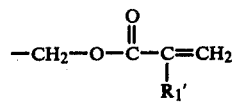

each $R_1'$ represents a hydrogen atom, a halogen atom or an alkyl group having 1–4 carbon atoms, $R_1''$ represents a hydrogen atom, a —OH group or a group of the following formula

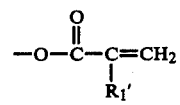

in which $R_1'$ has the same meaning as defined above, m is an integer of 1 or more, n is an integer of 2 or more, and p is 0 or 1, and a methacrylic or acrylic acid adduct of epoxy resin; an organic peroxide; and a photosensitizer.

5. A pickup arm device according to claim 4, wherein said acrylate material is a mixture of 20–70 parts by weight of a hydroxyalkylacrylate or methacrylate and 30–70 parts by weight of an acrylic or methacrylic acid adduct of bisphenol A-type epoxy resin.

6. A pickup arm device according to claim 4, wherein said organic peroxide is contained in an amount of 0.1–10 parts by weight per 100 parts by weight of said acrylate material, and said photosensitizer is contained in an amount of 0.1–10 parts by weight per 100 parts by weight of said acrylate material.

* * * * *